United States Patent [19]
Jeffries et al.

[11] Patent Number: 5,913,391
[45] Date of Patent: Jun. 22, 1999

[54] DAMPER

[75] Inventors: Mark S. Jeffries, Florence; Archie L. Evans, Aynor; Maurice Ladd, Florence, all of S.C.

[73] Assignee: AVM, Inc., Marion, S.C.

[21] Appl. No.: 08/780,269

[22] Filed: Jan. 9, 1997

[51] Int. Cl.⁶ .................................................. F16F 5/00
[52] U.S. Cl. ............................................ 188/317; 188/316
[58] Field of Search ...................................... 188/269, 283, 188/317, 322.15, 322.22; 267/64.11, 64.12, 34, 120, 124; 16/51, 52, 66; 248/161; 293/134

[56] References Cited

U.S. PATENT DOCUMENTS

| | | | |
|---|---|---|---|
| 3,022,061 | 2/1962 | Takagi | 188/317 |
| 3,762,514 | 10/1973 | Frietag | 188/300 |
| 3,865,356 | 2/1975 | Wossner | 188/317 |
| 4,230,309 | 10/1980 | Schnitzius | 267/120 |
| 4,503,951 | 3/1985 | Imaizumi | 188/322.15 |
| 4,558,767 | 12/1985 | Taylor | 188/322.22 |
| 5,579,874 | 12/1996 | Jeffries et al. | 188/322.15 |
| 5,620,066 | 4/1997 | Schuttler | 267/64.12 |

*Primary Examiner*—Chris Schwartz
*Attorney, Agent, or Firm*—McAndrews, Held & Malloy, Ltd.

[57] ABSTRACT

The orientation insensitive, non-cavitating differential, bi-directional damper has a tubular body defining a closed, elongated chamber that has a first end and a second end. A piston assembly is disposed in and is movable within a portion of the chamber. One end of a piston shaft is connected with the piston assembly and the other end of the shaft extends out of one end of the chamber. Another assembly is disposed in the chamber between the piston assembly and the other end of the chamber. A floating piston is disposed in the chamber and is movable in the chamber between the other assembly and the other end of the chamber. The portion of the chamber between the other end of the chamber and the floating piston is filled with gas while the remainder of the chamber is filled with fluid. The floating piston is spring biased toward the other assembly. Orifices in the piston assembly control the rate of fluid flow across the piston assembly when the piston assembly moves relatively to the tubular body. The orifices in the other assembly control the rate of fluid flow across the other assembly when the piston assembly moves relatively to the tubular body.

15 Claims, 1 Drawing Sheet

DAMPER

BACKGROUND OF THE INVENTION

The present invention relates to dampers, and more particularly, to dampers of the type that may be used where the movement of a lid or weight needs to be decelerated or restrained.

Different types or designs of such dampers are known. Generally speaking, one traditional design employs a tubular body that defines an elongated closed chamber filled with an incompressible fluid or liquid. A piston and shaft assembly is disposed within the chamber so that one end of the shaft extends out of the chamber. The one end of the shaft and the tubular body are connected, respectively, between a member whose motion is to be dampened and a relatively fixed member. Valves or other means, which are carried by the piston assembly, serve to control the fluid flow across the piston assembly. The dampening rate of the damper is determined by the rate of fluid flow across the piston assembly as the piston assembly is moved relatively with respect to the tubular body.

The operational orientation of dampers of this traditional design is limited due to potential problems with cavitation. This has adversely affected and curtailed usage of such dampers. Those working in the damper art have long sought a damper design that was practical, orientation insensitive and non-cavitating.

BRIEF SUMMARY OF THE INVENTION

The improved damper of our present invention is orientation insensitive in that the damper eliminates the problem of "cavitation" or "free fall" inherent in the heretofore traditional damper designs. Our improved non-cavitating damper includes novel structure which assures that the damping piston is always in fluid. This permits our improved damper to be mounted in any direction: shaft up, shaft down and even horizontal. This versatility of our improved damper enables it to be applied anywhere a lid or weight needs to be decelerated. For instances, they may be used to dampen the closing of a plastic printer cover, controlling the opening speed of a liftdown gate, and controlling the bidirectional movement of steering linkage. Our improved damper may also accommodate severe loads (such as, for example, a hospital gurnee or a dumpster lid), and is particularly effective for medium to heavy loads with strokes of four or more inches. Its versatility is largely due to the utilization of a unique sealed floating piston that moves back and forth, with movement of the piston and shaft assembly, to maintain pressure on the fluid in the chamber at all times and to assure uniform damping as the piston and shaft assembly extends and compresses.

Our improved damper is also space effective in that it can often be fit into an "envelope" smaller than other traditional dampers. Additionally, our improved damper may be designed to dampen on extension, compression, or in both directions with a wide range of damping rates. Our damper is practical and sturdy enough to control loads in excess of one hundred pounds, but is also sensitive enough to dampen loads as light as three pounds.

Accordingly, a primary object of the present invention is to provide an improved, practical, orientation insensitive, non-cavitating, differential, bi-directional damper.

Another object of the present invention is to provide an improved damper of the type described where the damper includes a housing defining a closed chamber which has a first end and a second end; where a first assembly is disposed in the chamber between the first and second ends thereof so that a first chamber portion is defined in the chamber between the first end of the chamber and the first assembly; where a piston assembly is disposed within the first chamber portion, is movable within and relative to the housing and subdivides the first chamber into a chamber compression sub-portion, which is defined between the piston assembly and first assembly, and a chamber extension sub-portion, which is defined between the piston assembly and the first end of the chamber; where a shaft is connected, at one end, with the piston assembly and has its other end extending out of the chamber through a sealed opening in the first end of the chamber; where a floating piston or similar member is disposed in the chamber between the first assembly and the second end of the chamber, is movable within and relative to the chamber, defines a second chamber portion in the chamber between the floating piston and the first assembly, and defines a third chamber portion in the chamber between the floating piston and the second end of the chamber; where the first and second chamber portions are filled with fluid and the third chamber portion is filled with gas; where the piston assembly includes first means for permitting flow of the fluid at a pre-determined rate of flow from the compression sub-portion of the chamber to the extension sub-portion of the chamber when the first assembly and the piston assembly are moved relatively toward one another, and second means for permitting flow of the fluid at a pre-determined rate of flow from the extension sub-portion to the compression sub-portion of the chamber when the piston assembly and the first assembly move relatively away from another; where the first assembly includes third means for permitting the flow of the fluid at a pre-determined rate of flow from the compression sub-portion of the chamber to the second portion of the chamber when the piston assembly and the first assembly move relatively toward one another, and fourth means for permitting flow of the fluid at a pre-determined rate of flow from the second portion of the chamber to the compression sub-portion of the chamber when the piston assembly and the first assembly move relatively away from one another; and where the floating piston is biased away from the second end of the chamber.

A further object of the present invention is to provide an improved orientation insensitive, non-cavitating, differential, bi-directional damper of the type described where the rates of flow of the first, second and third flow permitting means may be pre-selected so that the rates of dampening provided by the damper may be independently tuned. A related object of the present invention is to provide an improved damper of the type described where the first, second, and third flow permitting means include orifices.

A still further object of the present invention is to provide an improved orientation insensitive, non-cavitating, differential, bi-directional damper of the type described where the chamber is elongated and has a longitudinal central axis that extends between the ends of the chamber; where the longitudinal axis of the piston assembly shaft is co-axial with the longitudinal central axis of the chamber; and where the piston assembly and floating piston move, relative to the chamber, in a direction parallel to the longitudinal axes of the piston assembly shaft and chamber. A related object of the present invention is to provide an improved damper of the type described where a spring, which biases the floating piston, is disposed in the third portion of the chamber.

These and other objects, benefits and advantages of the present invention will become more apparent from the following description of the preferred embodiment of the present invention, which is described in connection with the following drawings.

DETAILED DESCRIPTION OF THE INVENTION

Figure 1:
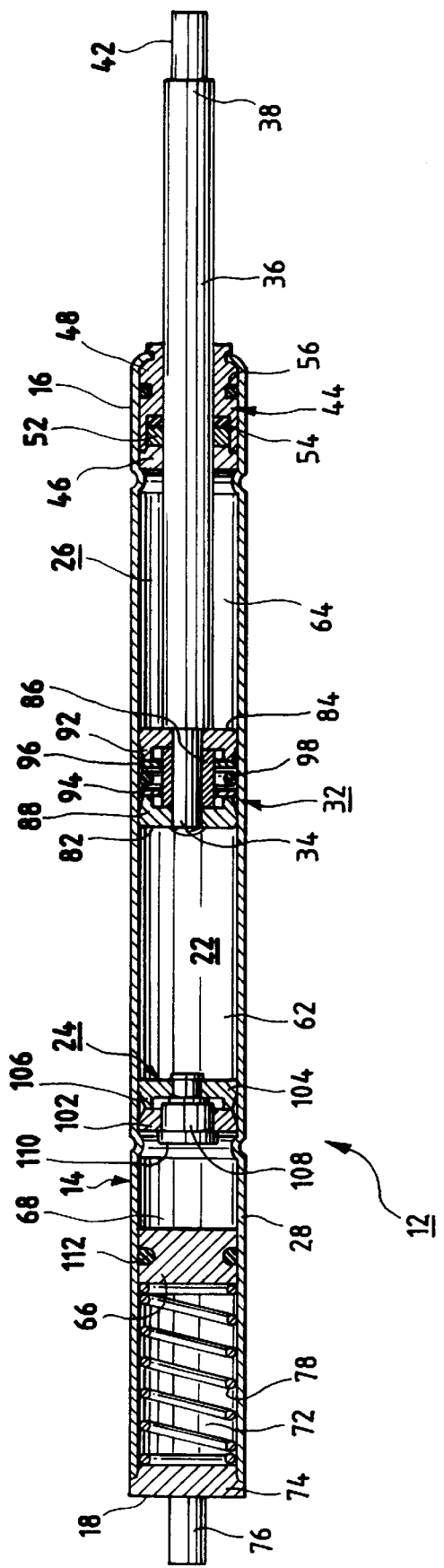
FIG. 1 is a longitudinal, vertical cross-sectional view of a orientation insensitive, non-cavitating, differential bi-directional damper of the present invention.

A preferred embodiment of the improved orientation insensitive, non-cavitating, differential, bi-directional damper of the present invention is indicated generally at 12 in FIG. 1. The damper 12 includes a generally tubular housing 14 that has a first end 16 and a second end 18 that has a generally cylindrical cross-section, that has a longitudinal central axis extending between the ends 16 and 18. The housing 14 defines a closed, elongated cavity 22 that extends longitudinally between the ends 16 and 18.

A first assembly 24 is disposed within the cavity 22 between the ends 16 and 18. The first assembly 24, the first end 16 of the housing 14 and the wall 28 of the housing 14 define a first portion 26 of the cavity 22. The first assembly 24 does not move relative to the housing 14.

A piston assembly 32 is disposed within the first chamber portion 26 and between the first assembly 24 and the first end 16 of the housing 14. The piston assembly is able to move, back and forth parallel to the longitudinal central axis of the chamber 22, relatively with respect to the housing 14 within the first chamber portion 26 and between the first assembly and the first end 16 of the housing 14. As described in more detail hereinafter, the piston assembly 32 is of conventional design and construction.

One reduced diameter end 34 of a shaft 36 is connected with the piston assembly 32 in a conventional manner. The other end 38 of the shaft 36 extends out of the first end 16 of the housing 14, and the longitudinal axis of the shaft is coaxial with the longitudinal axis of the housing. The length of the shaft 36 is such that the end 38 is without the housing 14. A conventional connector 42 is mounted on the other end 38 of the shaft 36. The connector 42 is adapted to connect the shaft with, for instance, a conventional ball type connector (not shown) so that the shaft 36 and piston assembly 32 can be attached to a relatively movable member (not shown) to be damped, such as a dumpster lid, or to a relatively fixed member (not shown) such as the dumpster body.

A conventional shaft seal assembly 44 is disposed within and serves to close the first end 16 of the housing 14. The shaft 36 extends slidingly through the central axial opening in the assembly 44 in a conventional manner. The shaft seal assembly 44 includes a retainer 46 (which is press fit within the housing 14), a bushing 48, an annular shaft seal 52, and a teflon ring 54, all of which surround the shaft 36. An O-ring 56 is disposed in an annular groove in the exterior radially outwardly facing surface of the bushing 48 and serves as a seal between the bushing and the adjacent wall 28 of the housing 14. The ends of the wall 28 of the tubular housing 14, which define the first end 16, are swaged inwardly so as to assist in securing the shaft seal assembly 44 within the housing 14.

The movable piston assembly 32 sub-divides the first chamber portion 26 into a compression sub-portion 62, which is defined between the first assembly 24 and the piston assembly 32, and an extension chamber sub-portion 64, which is defined between the piston assembly 32 and the first end 16 of the housing, and more particularly, the shaft seal assembly 44. The volumes of the sub-portions 62 and 64 will, of course, vary as the piston assembly 32 moves, within the first chamber portion 26, relative to the housing 14.

A floating piston 66 is disposed within the cavity 22 between the first assembly 24 and the second end 18 of the housing 14 and may move within the cavity 22, in a direction parallel to the longitudinal axis of the housing 14, between the first assembly 24 and the end 18. A second portion 68 of the cavity 22 is defined, within the housing 14, between the floating piston 66 and the first assembly 24. A third portion 72 is defined in the cavity 22 between the floating piston 66 and the second end 18.

The second end 18 of the housing 14 is closed and sealed by a end cap 74 secured to the second end 18. The end cap 74 includes a connector 76 for attaching or connecting the end cap, and thus the housing 14 to a member (not shown). The connector 76 is adapted to be connected to a relatively fixed member when the connector 42 is connected to the relatively movable member to be damped, or visa versa.

A fluid such as one of the fluids conventionally used in dampers of this type, fills the first and second chamber portions 26 and 68. A gas, such as conventionally used in gas springs, fills third chamber portion 72. The gas may be pressurized although it could also be at atmospheric pressure.

A conventional coil compression spring 78 is disposed within the third chamber portion 72 of the housing 14 and between the end cap 74 and the floating piston 66. The spring serves to bias the floating piston away from the end cap 74. As explained hereinafter, the pressure of the gas in the third chamber portion 72 and the bias of the coil compression spring 78 are sufficient so that the improved damper 12 performs as hereinafter described.

Returning now to the piston assembly 32, a pair of structurally identical, annular orifices plates 82 and 84 are mounted on the reduced diameter end 34 of the shaft 36 in a conventional manner. An annular spacing member 86 is also mounted on the reduced diameter end 34 between the plates 82 and 84 and serves to hold the plates 82 and 84 in a separated, fixed spaced relationship.

As shown in FIG. 1, each of the plates 82 and 84 has a generally cup shaped cross-section, with the distal or open ends 88 and 92 of the plates 82 and 84, respectively facing each other. The diameters of the annular, radially outwardly facing surface of the plates 82 and 84 are less than the diameter of the adjacent housing wall 28 in the first chamber portion 26. As a result, fluid may readily pass between these outer surfaces of the plates and the tubular housing wall 28.

A pair of annular washers 94 and 96 are mounted on the spacing member 86 and extend radially between the member 86 and the tubular housing wall 28. The radial inner diameters of the washers 94 and 96 are such that they may readily move or slide, back or forth (in a direction parallel to the longitudinal central axis of the shaft 36) along and with respect to the spacing member 86, and thus also with respect to the plates 82 and 84 when the piston assembly 32 moves. The radial outer diameters of the washers 94 and 96 are less than the diameter of the inner surface of the housing wall 28, and this facilitates the aforesaid movement of the washers.

An O-ring 98 is disposed about the spacing member 86 and between the washers 94 and 96. The O-ring 98, which moves with the piston assembly 32, serve to seal the space between the housing wall 28 and one of the washers 94 or 96 when the O-ring is a adjacent to that one washer.

The distal ends 88 and 92 of the orifices plates 82 and 84 have one or more radially directed grooves (not shown) formed therein, preferably by coining. The number and size of these grooves determine the rate that fluid can flow between a washer 94 or 96 and its adjacent distal end 88 or 92 when the washer is forced and held against the distal end 88 or 92 during relative movement between the housing 14 and the piston assembly 32.

To recap, a fluid flow path is defined across the piston assembly 32, and thus between the compression sub-portion 62 and the extension sub-portion 64. This flow path includes the spacings between the radially outwardly facing surfaces of the plates 82 and 84 and the housing wall 28, between the distal ends 88 and 92 and the washers 94 and 96 and between the radially inwardly facing surfaces of the washers and the spacing member 86. When a washer 94 or 96 is abutted against its adjacent distal end 88 or 92, the grooves in that end serve as the most restricted part of the fluid flow path. When a washer is spaced from its adjacent distal end, this part of the fluid flow path (that is, the part between the washer and the distal end) is much larger. By preselecting the size and number of grooves in the distal ends 88 and 92, the fluid flow rates, and thus the damper extension and compression rates, can be pre-determined for various anticipated damper uses.

In sum, when relative movement occurs between the tubular housing 14 and the piston assembly 32, such that the piston assembly moves relatively toward the first assembly 24, fluid in the sub-portion 62 flows across the piston assembly 32 to the sub-portion 64. Specifically, fluid flows between the radially outwardly facing surfaces of the orifice plate 82 and the housing wall 28, between the distal end 88 and the washer 94, which at this time, are spaced apart, and between the radially inwardly facing surfaces of the washer 94 and the spacing member 86. The fluid flow continues between the radially inwardly facing surface of the washer 96 and the spacing member 86 and through the grooves in the distal end 92 of the orifice plate 84. Due to the relative movement of the piston assembly 32, the washer 96 is forced and abutted tightly against the distal end 92. Hence since the grooves in the distal end 92 are the only means by which the fluid can pass between the washer 92 and the distal end 96, the size and number of these grooves, in effect, determine the rate of fluid flow across or past the piston assembly 32. Similarly, when the piston assembly 32 is moved relatively, with respect to the tubular housing, such that the assembly 32 moves away from the first assembly 24, the grooves in the distal end 88 of the orifice plate 82 determine the rate of fluid flow across the piston assembly 32.

The first assembly 24 includes an annular flow washer 102 that is mounted within the housing 14 such that its radially outwardly facing surface abuts the housing wall 28. The assembly 24 also includes an annular orifice plate 104 which is structurally similar to the orifice plates 82 and 84. The distal end 106 of the plate 104 faces toward the washer 102 (that is, toward the second end 18 of the housing 14). The plate 104 is mounted on one end of a rivet 108 (that is, the end which faces the piston assembly 32). Specifically, the rivet 108 extends through the central opening in the annular flow washer 102, and its longitudinal axis is coaxial with the longitudinal axis of the housing 14. The rivet 108 includes a head portion 110 on its end that faces the second end 18 of the housing. The portion 110 has a larger diameter than the central opening in the annular washer 102.

The respective radial dimensions of the center opening of the washer 102 and the adjacent radially outwardly facing surface of the rivet 108 are such that the rivet may move or slide back and forth (in a direction generally parallel to the longitudinal central axis of the housing 14) relative to the "fixed" washer 102 and that fluid may flow therebetween. Like the distal ends 88 and 92 of the orifice plates 82 and 84, the distal end 106 of the plate 104 has one or more generally radially directed grooves therein, preferably formed by coining.

Fluid can flow across the first assembly 24 by flowing between the radially outwardly facing surface of the orifice plate 104 and the tubular housing wall 28, between the distal end 106 and the flow washer 102, and between the radially inwardly facing surface of the flow washer 102 and the radially outwardly facing surface of the rivet 108. The rivet 108 and the orifice plate 104 are secured together so that they move together, and the flow washer 102 is fixed with respect to the tubular housing 14. The rivet 108 and orifice plate 104 move between a first position where the distal end 106 of the plate 104 tightly abuts against the adjacent side of the washer 102 and a second position where the distal end 106 is spaced from the washer 102. Again, the grooves in the distal end 106 serve as the only flow fluid path when the washer 102 and plate 104 are in the first position.

Hence, when the piston assembly 32 is moved relative to the housing 14 such that the assembly 32 and the assembly 22 move toward one another, the rate of fluid flow across the first assembly 24 (that is from the compression chambers sub-portion 62 to the second chamber portion 68) is limited by the size and number of the grooves in the distal end 106 of the plate 104 Similarly, when the piston assembly 32 moves, relatively, away from the first assembly 24, fluid may flow from the second chamber portion 68 to the compression chamber sub-portion 62 and the rate of fluid flow is not limited by the size and number of the grooves since the flow washer 102 and the orifice plate 104 are spaced apart.

The floating piston 66 includes an O-ring 112 disposed in a groove in its radially outwardly facing surface. This O-ring forms a fluid/gas seal between the floating piston 66 and the adjacent tubular housing wall 28 so as to prevent leakage of fluid from the second chamber portion 68 to the third portion 72 and the leakage of gas from the third chamber portion 72 to the second chamber portion 68 as the piston 66 moves within the chamber 12.

When fluid flows (that is, is forced by shift displacement volume) from the compression chamber sub-portion 62 into the second chamber portion 68, the floating piston 66 tends to move toward the second end 18 against the bias of the spring 78 and the gas in the third chamber portion 72. Conversely, when fluid flows from the second chamber portion 68 into the compression chamber sub-portion 62, the piston moves toward the first assembly 24 under the bias of the spring 78 and the gas in the portion 72. As a result of such movement, the floating piston 66 maintains pressure on the fluid in the second chamber portion 68 assuring that there will always be sufficient fluid in the first chamber portion 26 so that cavitation will not occur.

As noted above, one of the advantages of the improved damper of the present invention is that the grooves formed in the distal ends 88, 92 and 106 of the orifice plates 82, 84 and 104 will determine the rates of flow and thus determine the rates of dampening of the damper 12. Various sizes and numbers of grooves can be used in each of the distal ends. By pre-selecting the sizes and numbers of the grooves, the damping rates, both in the shaft extending direction and in the shaft compression direction, may be closely and carefully controlled and regulated. While in the preferred embodiment of the invention, the grooves in the distal ends of the orifice plates are used to control or regulate the rates of dampening, it should be apparent to those having a skill in this art that other valves or orifices arrangements may be used to achieve the same function and purpose.

We claim:

1. An improved orientation insensitive, non-cavitating, differential, bi-directional damper comprising:
   a housing that defines a closed chamber which has a first end and a second end;
   a first assembly that is disposed in the chamber between the first and second ends of the chamber, with a first chamber portion being defined in the chamber between the first end of the chamber and the first assembly;
   a piston assembly that is disposed in the first chamber portion and that is movable in and relative to the chamber, with the piston assembly subdividing the first chamber portion into a chamber compression sub-portion, which is between the piston assembly and the first assembly, and a chamber extension sub-portion which is between the piston assembly and the first end of the chamber;
   a shaft that has a first end and a second end, with the first end of the shaft being connected with the piston assembly and with the shaft extending out of the chamber, through a sealed opening in the first end of the chamber, so that the second end of the shaft is disposed outside the chamber;
   a floating 66 piston that is disposed in the chamber between the first assembly and the second end of the chamber and that is movable in and relative to the chamber, with a second chamber portion being defined in the chamber between the floating piston and the first assembly, with a third chamber portion being defined in the chamber between the floating piston and the second end of the chamber, with the first and second chamber portions being filled with liquid, and with the third chamber portion being filled with gas;
   the piston 32 assembly including a first flow metering orifice that permits the flow of the liquid, at a first pre-determined rate of flow, from the compression sub-portion of the chamber to the extension sub-portion of the chamber whenever the first assembly and the piston assembly move relatively toward one another, and a second flow metering orifice that permits the flow of the liquid, at a second pre-determined rate of flow, from the extension sub-portion of the chamber to the compression sub-portion of the chamber whenever the piston assembly and the first assembly move relatively away from one another;
   the first assembly including a third flow metering orifice that permits the flow of the liquid, at a third pre-determined rate of flow, from the compression sub-portion of the chamber to the second portion of the chamber whenever the piston assembly and the first assembly move relatively toward one another and a fourth flow metering orifice that permits flow of the liquid, at a fourth pre-determined rate of flow, from the second portion of the chamber to the compression sub-portion of the chamber whenever the piston assembly and the first assembly move relatively away from one another; and
   a spring biasing the floating piston away from the second end of the chamber.

2. The improved orientation insensitive, non-cavitating, differential, bi-directional damper of claim 1 wherein the spring biasing the floating piston is disposed in the third portion of the chamber.

3. The orientation insensitive, non-cavitating, differential, bi-directional damper of claim 1 wherein the first rate of flow, the second rate of flow, the third rate of flow, and the fourth rate of flow may be pre-determined so that the rates of dampening provided by the damper may be independently tuned.

4. The orientation insensitive, non-cavitating, differential, bi-directional damper of claim 1 wherein the first flow metering orifice, the second flow metering orifice and the third flow metering orifice each include grooves through which the metered flow of liquid occurs.

5. The orientation insensitive, non-cavitating, differential, bi-directional damper of claim 1 wherein the chamber is elongated and has a longitudinal central axis that extends from the first end of the chamber to the second end of the chamber; wherein the longitudinal central axis of the shaft is co-axial with the longitudinal central axis of the chamber; and wherein the piston assembly and the floating piston move, relative to the chamber, in a direction parallel to the longitudinal axes of the shaft and the chamber.

6. The orientation insensitive, non-cavitating, differential, bi-directional damper of claim 5 wherein the housing is a tube.

7. The orientation insensitive, non-cavitating, differential, bi-directional damper of claim 1 wherein the floating piston includes a seal that prevents against the leakage of the liquid from the second portion of the chamber to the third portion of the chamber and that prevents against the leakage of the gas from the third portion of the chamber to the second portion of the chamber.

8. The orientation insensitive, non-cavitating, differential, bi-directional damper of claim 1 wherein the first flow metering orifice of the piston assembly permits flow of the liquid at a fifth pre-determined rate of flow from the extension sub-portion of the chamber to the compression sub-portion of the chamber whenever the piston assembly and the first assembly move relatively away from one another; and wherein the second flow metering orifice of the piston assembly permits the flow of the liquid at a sixth pre-determined rate of flow from the compression sub-portion of the chamber to the extension sub-portion of the chamber whenever the piston assembly and the first assembly move relatively toward one another.

9. The orientation insensitive, non-cavitating, differential, bi-directional damper of claim 1 wherein the rate of flow permitted by the third flow metering orifice of the first assembly from the compression sub-portion of the chamber to the second portion of the chamber is less than the rate of flow permitted by the fourth flow metering orifice of the first assembly from the second portion of the chamber to the compression sub-portion of the chamber.

10. The orientation insensitive, non-cavitating, differential, bi-directional damper of claim 9 wherein the rate of flow of the first flow metering orifice of the piston assembly, the rate of flow of the second flow metering orifice of the piston assembly, the rate of flow of the third flow metering orifice of the first assembly, and the rate of flow of the fourth flow metering orifice of the first assembly may be pre-determined so that the rates of dampening provided by the damper may be independently tuned.

11. The orientation insensitive, non-cavitating differential, bi-directional damper of claim 10 wherein the chamber is elongated and has a longitudinal central axis that extends from the first end of the chamber to the second end of the chamber; wherein the longitudinal central axis of the shaft is co-axial with the longitdinal central axis of the chamber; and wherein the piston assembly and the floating piston move, relative to the chamber, in a direction parallel to the longitudinal axes of the shaft and the chamber.

12. The orientation insensitive, non-cavitating, differential, bi-directional damper of claim 11 wherein the first flow metering orfice, the second flow metering orifice and the third flow metering orifice each include grooves through the metered flow of liquid occurs.

13. The orientation insensitive, non-cavitating, differential, bi-directional damper of claim 12 wherein the housing is a tube; and wherein the spring biasing the floating piston is disposed in the third portion of the chamber.

14. The orientation insensitive, non-cavitating, differential, bi-directional damper of claim 13 wherein the first floating piston includes a seal that prevents against the leakage from the second portion of the chamber to the third portion of the chamber and that prevents against the leakage of the gas from the third portion of the chamber to the second portion of the chamber.

15. The improved orientation insensitive, non-cavitating, differential, bi-directional damper of claim 14 wherein the first flow metering orifice of the piston assembly permits flow of the liquid at a fifth pre-determined rate of flow from the extension sub-portion of the chamber to the compression sub-portion of the chamber whenever the piston assembly and the first assembly move relatively away from one another; and wherein the second flow metering orifice of the piston assembly permits the flow of the liquid at a sixth pre-determined rate of flow from the compression sub-portion of the chamber to the extension sub-portion of the chamber whenever the piston assembly and the first assembly move relatively toward one another.

* * * * *